(12) United States Patent
Viikari et al.

(10) Patent No.: US 10,145,729 B2
(45) Date of Patent: Dec. 4, 2018

(54) INTERMODULATION SENSOR PLATFORM BASED ON MECHANICAL RESONATOR

(71) Applicant: Teknologian tutkimuskeskus VTT, VTT (FI)

(72) Inventors: Ville Viikari, Espoo (FI); Heikki Seppä, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 602 days.

(21) Appl. No.: 14/402,697

(22) PCT Filed: May 22, 2013

(86) PCT No.: PCT/FI2013/050561
§ 371 (c)(1),
(2) Date: Nov. 21, 2014

(87) PCT Pub. No.: WO2013/175073
PCT Pub. Date: Nov. 28, 2013

(65) Prior Publication Data
US 2015/0128707 A1   May 14, 2015

Related U.S. Application Data

(60) Provisional application No. 61/649,951, filed on May 22, 2012.

(51) Int. Cl.
*G01H 13/00* (2006.01)
*H04B 1/28* (2006.01)

(52) U.S. Cl.
CPC .............. *G01H 13/00* (2013.01); *H04B 1/28* (2013.01)

(58) Field of Classification Search
CPC .................................. G01H 13/00; H04B 1/28
(Continued)

(56) References Cited

U.S. PATENT DOCUMENTS 4,890,300 A * 12/1989 Andrews ............... H03F 1/3241
375/297
6,378,360 B1 * 4/2002 Bartels ............... B60C 23/0433
73/146.5
(Continued)

FOREIGN PATENT DOCUMENTS

CN        102301214 A       12/2011
JP        2007308121 A  *   11/2007
(Continued)

OTHER PUBLICATIONS

Viikari, V. et al. Intermodulation read-out principle for passive wireless sensors. IEEE Transactions on Microwave Theory and Techniques. Apr. 2011, vol. 59, No. 4. EPOQUENET NPL: XP011372578.
(Continued)

*Primary Examiner* — R. A. Smith
*Assistant Examiner* — John M Royston
(74) *Attorney, Agent, or Firm* — Seppo Laine Oy

(57) ABSTRACT

The present invention related to a new passive wireless sensor platform which is based on the intermodulation communication principle. The platform may utilize a quartz crystal or other mechanical resonator. Additionally, the platform allows for a narrow bandwidth and/or ID-code of a sensor. Certain embodiments enable high frequencies and large read-out distances. It facilitates a generic sensor element and can thus be used to monitor virtually any quantity. Additionally, it offers a means to realize a wireless passive sensor using MEMS sensor technology.

19 Claims, 5 Drawing Sheets

(58) Field of Classification Search
USPC .......................................................... 73/584
See application file for complete search history.

(56) References Cited

U.S. PATENT DOCUMENTS

| | | | | |
|---|---|---|---|---|
| 6,888,471 | B2* | 5/2005 | Elsner | B60C 23/0433 |
| | | | | 340/442 |
| 2008/0224568 | A1 | 9/2008 | Kvisteroy et al. | |
| 2010/0134257 | A1* | 6/2010 | Puleston | G06K 7/0008 |
| | | | | 340/10.4 |
| 2010/0277121 | A1* | 11/2010 | Hall | B60L 11/182 |
| | | | | 320/108 |
| 2011/0158136 | A1* | 6/2011 | Lo Hine Tong | H03D 9/0633 |
| | | | | 370/277 |
| 2011/0205027 | A1 | 8/2011 | Hilhorst et al. | |
| 2012/0187983 | A1* | 7/2012 | Lin | H03B 21/01 |
| | | | | 327/113 |

FOREIGN PATENT DOCUMENTS

| | | |
|---|---|---|
| JP | 2008164592 A | 7/2008 |
| WO | WO2011121180 A1 | 10/2011 |

OTHER PUBLICATIONS

Viikari, V. et al. Passive wireless sensor platform utilizing a mechanical resonator. IEEE Sensors Journal. Apr. 2013, vol. 13, No. 4.

* cited by examiner

# INTERMODULATION SENSOR PLATFORM BASED ON MECHANICAL RESONATOR

FIELD OF INVENTION

The present invention related to a new passive wireless sensor platform which is based on the intermodulation communication principle. The platform may utilize a quartz crystal or other mechanical resonator. Additionally, the platform allows for a narrow bandwidth and/or ID-code of a sensor.

BACKGROUND OF THE INVENTION

Wireless passive sensors do not require any power source for operation other than the interrogation signal from the reader. The advantages of passive sensors over active and semi-passive sensors are that they are potentially more inexpensive and their operation conditions or life-time are not limited by the power source, such as a battery or energy harvester.

Passive wireless sensors can be divided into digital and analog sensors. The IC (Integrated Circuit)-based RFID (Radio Frequency Identification) utilizes digital logic which offers highly sophisticated features such as anti-collision protocols and non-volatile memory. The IC RFID is mostly used for identification, but can also be equipped with a sensor element.

As compared to digital architecture, analog sensors may potentially offer better energy efficiency. This is because the digital electronics uses a fraction of the received energy to operate the IC, whereas analog sensors can theoretically backscatter all the received energy. In addition, the read-out distance of digital sensors is often power-limited while that of analog sensors is limited by the signal-to-noise-ratio. Therefore, the read-out distance of analog sensors can be increased by increasing the integration time. Due to these reasons, analog sensors have advantages in certain special applications.

Analog sensors include surface acoustic wave (SAW) based RFID, resonance sensors, and harmonic sensors. SAW sensors utilize an interdigital transducer patterned on a piezoelectric substrate to convert the electromagnetic energy into a SAW. SAW is then manipulated with acoustical reflectors, transformed back to electromagnetic energy, and radiated to the reader device.

The measured quantity affects the propagation properties of SAW on the piezoelectric substrate. The need to use a piezoelectric material for a sensing element limits possible applications. In addition, the smallest line-width of the IDT structure limits the highest operation frequency of a SAW tag to a few GHz.

Resonance sensors consist of a simple resonance circuit, whose resonance is sensitive to a measured quantity. These sensors require a near-field coupling to the reader, which limits their read-out distance to a few centimeters. Another hindrance is that their resonance may be affected by a proximity to conductive or dielectric objects. Resonance sensors are used for example to monitor moisture in building structures, strain, and blood pressure.

Harmonic sensors backscatter the sensor data at an harmonic frequency of the interrogation signal frequency. The concept was first proposed for telemetry [9]. Later, harmonic sensors that double the interrogation frequency have been used to track insects in biological and agricultural studies and to locate avalanche victims. Recently, an intermodulation communication principle is proposed for sensing applications. In this principle, the sensor is actuated by two closely located frequencies and the sensor data is backscattered at an intermodulation frequency. As compared to harmonic principle, the intermodulation communication offers smaller frequency offset. Small frequency offset facilitates circuit design and compliance with frequency regulations.

There are some drawbacks with the previously published sensors utilizing the intermodulation communication principle. First, the sensor presented in uses a MEMS element simultaneously for mixing and sensing, which implies that the MEMS needs to be compromised between the two functions. Similarly, the sensor presented in utilizes a ferroelectric varactor both for mixing and sensing. In addition, the resonance of the ferroelectric sensor may be affected by a proximity to conductive or dielectric objects.

The sensor platform presented in incorporates a separate mixer and it can be equipped with a generic capacitive sensor element. A hindrance of this design, however, is that an inductor is used to obtain a resonance at a low frequency. A self-resonance frequency of the inductor limits the smallest achievable frequency offset and the quality factor of the inductor limits the conversion efficiency and thus the read-out distance. Due to these reasons, the frequency offset needs to be relatively large and the read-out distance is limited. Large frequency offset impedes the compliance with frequency regulations.

SUMMARY OF THE INVENTION

It is an object of the present invention to provide a wireless sensor.

It is an aspect of certain embodiments to provide a wireless sensor comprising an antenna and a mixing element electrically connected to the antenna and to a low-frequency circuit.

Moreover, it is an aspect of certain embodiments that the low frequency circuit comprises a mechanical resonator, and a sensing element.

According to certain examples, the mixing element is or includes a Schottky diode. Additionally, according to certain examples, the mechanical resonator comprises a quartz crystal or MEMS resonator. Still yet, according to certain examples the sensing element can be a capacitive sensor element, resistive sensor element or inductive sensor element.

Additionally, it is an object of the present invention to provide a method of wirelessly reading a sensor element.

It is an aspect of certain embodiments to provide a method comprising the steps of; transmitting two signals from a reading device to a wireless sensor, wherein each signal is transmitted at a different frequency, wherein the difference between the two signal frequencies induces an excitation of a mechanical resonator coupled to a sensing element, receiving an intermodulation response from the wireless sensor, determining the impedance of a sensing element based on the received intermodulation response, and providing a readout of the sensor element based on the determined impedance and known resonance of the mechanical resonator coupled to the sensing element.

Presented herein is a sensor architecture that utilizes a quartz-crystal or other mechanical resonator, such as a MEMS resonator, to obtain a resonance at a low frequency. As compared to electrical inductors, mechanical resonators offer a higher quality factor and equivalent inductance for a given self-resonant frequency. Therefore, the new architecture enables larger read-out distance and a smaller frequency offset. Small frequency offset facilitates compliance with frequency regulations. A narrow-band resonance provided by mechanical resonators also enables to realize an ID-code to the sensor.

Wireless sensors are needed in applications where wired read-outs cannot be used due to cost or complexity of the wiring, e.g., due to rotating parts or harsh environments. The platform solves the generic problem of reading out a sensor. Current solutions require a battery, offer a short read-out distance, and/or are suitable for only limited measured quantities.

Existing passive wireless sensors include RFID with an external microprocessor and a sensing element, SAW RFID, and resonance sensors. The read-out distance and the highest operation distance of the RFID are limited by the power rectifier and they are 5-10 m and a few GHz, respectively. When used with an external sensor element, the power consumption is further increased. The highest operation frequency of the SAW sensors is limited to a few GHz and its read-out distance at high frequencies is severely degraded by the poor electro-acoustic transformation efficiency of the interdigital transducer (IDT). The SAW RFID only suits for measurands towards which the piezo-electric substrate is inherently sensitive. The resonance sensors require a near-field coupling and provide thus very short read-out distance.

An aspect of embodiments of the present invention is to overcome at least some of the aforementioned challenges of the existing wireless sensors. The embodiment(s) enable high frequencies and large read-out distances. It facilitates a generic sensor element and can thus be used to monitor virtually any quantity. Additionally, it offers a means to realize a wireless passive sensor using MEMS sensor technology.

DETAILED DESCRIPTION OF EXEMPLARY EMBODIMENTS

In the intermodulation communication principle, a sensor replies at an intermodulation frequency when it is actuated by a reader device with two sinusoids. The sensor is designed such, that its intermodulation response (that is, the ratio between the voltage at the intermodulation frequency and at a fundamental frequency across the antenna) is affected by a sensor element.

Figure 1:
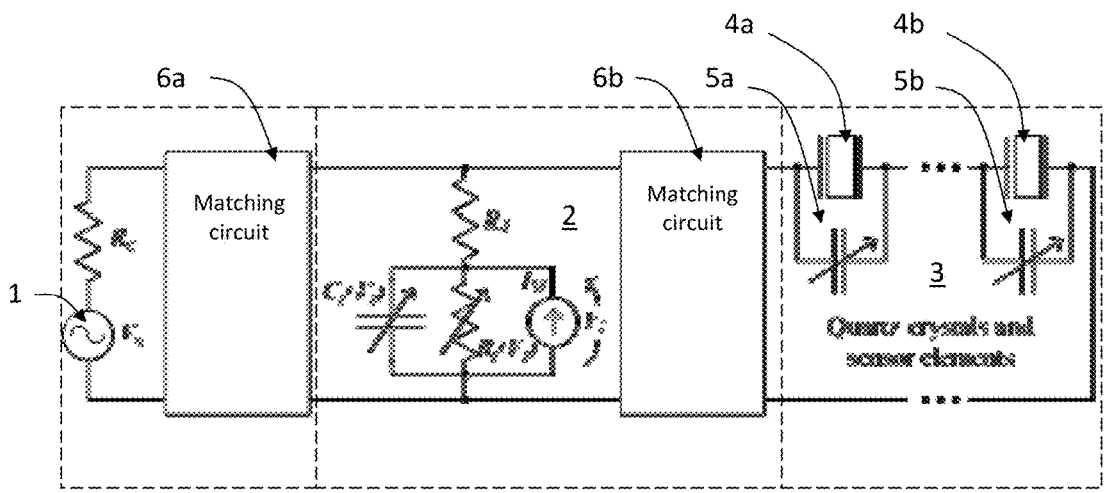
FIG. 1 shows an electrical equivalent circuit for a sensor utilizing the intermodulation communication principle.

The sensor comprises, for example, an antenna 1, a mixing element 2, and a low-frequency resonant circuit 3. The mixing element 2 may be a passive mixer. An example of a mixing element 2 is a Schottky diode as shown in FIG. 1. The mixer generates an excitation at the difference frequency, which is applied to the low-frequency resonant circuit 3. The low-frequency resonant circuit 3 comprises a capacitive, resistive, or inductive sensor element.

An example of the electrical equivalent circuit of the sensor is shown in FIG. 1. The antenna 1 is represented as a voltage source, the Schottky diode is used as a mixer 2, and the low-frequency circuit comprises one or more pairs of quartz-oscillators (4a, 4b) each in parallel with a capacitive sensor element (5a, 5b) respectively. In this configuration, capacitive sensors tune the resonances of quartz crystals. The configuration can facilitate several quartz crystal-sensor pairs provided that crystals resonate at different frequencies. Additionally, although shown with two quartz crystal-sensor pairs, a sensor may only comprise a single quartz crystal-sensor pair.

The Antenna may be coupled to a matching circuit 6a. Additionally, the mixing element may be coupled to a matching circuit 6b. Matching circuits 6a and 6b may be distinct from each other as shown in FIG. 1. The term matching circuit used herein refers to matching circuits used for their normal use, e.g. matching the impedance at a certain frequency range to be optimal for the desired function. One of ordinary skill will recognize numerous well known matching topologies which can be used to achieve the desired effect.

In what follows, an equation for the intermodulation response of the sensor under the small-signal conditions is derived. The analysis extends to cover also resistive mixing that dominates at low frequencies. In addition, several mixing processes are considered such that the intermodulation response can be accurately predicted outside the low-frequency resonance.

Harmonic Generation

The sensor antenna receives two sinusoids transmitted by a reader. The voltage generated across the junction is $$V_j = 2\sqrt{2P_{in}R_g}(S_{jg}(\omega_1)\sin \omega_1 t + S_{jg}(\omega_2)\sin \omega_2 t), \quad (1)$$

where $P_{in}$ is a received power (power available to a load under a conjugate match) at one frequency, $R_g$ is an antenna resistance, $S_{jg}$ is a voltage transfer function from antenna to diode junction, and $\omega_1$ and $\omega_2$ are angular frequencies of sinusoids. In the following analysis, we consider only the intermodulation frequency at $\omega_{IM} = 2\omega_1 - \omega_2$, although another intermodulation frequency occurs at $2\omega_2 - \omega_1$.

through the junction and the charge stored in the junction capacitance depends non-linearly on the voltage across the junction. The current through the junction is given as $$I_j(V_j) = I_s(e^{\alpha V_j} - 1) + \frac{d}{dt}\{Q_j(V_j)\}, \quad (2)$$

where $V_j$ is a voltage across the junction, $I_s$ is a saturation current, $\alpha = q/nkT$ where q is the elementary charge, n is an ideality factor, k is the Boltzmann's constant and T is a temperature. A charge stored in the junction is given as (possible trapped, voltage independent charge is omitted)

$$Q_j(V_j) = \frac{\Phi C_{j0}}{1-\gamma}\left(1 - \frac{V_j}{\Phi}\right)^{-\gamma+1}, \quad (3)$$

where $\Phi$ is a junction potential, $C_{j0}$ is a junction capacitance under zero-bias, and $\gamma$ is a profile parameter. The third-order Taylor's approximation for the charge at zero-bias is $$Q_j(V_j) \approx C_{j0}V_j + \frac{\gamma C_{j0}}{2\Phi}V_j^2 + \frac{\gamma(\gamma+1)C_{j0}}{6\Phi^2}V_j^3, \quad (4)$$

Substituting (4) into (2) and approximating the first term in (2) with the third order Taylor's expansion at zero bias. The current through the junction is $$I_j(V_j) \approx \left(\frac{1}{R_j} + j\omega C_{j0}\right)V_j + \left(\frac{\alpha}{2R_j} + \frac{j\omega C_{j0}\gamma}{2\Phi}\right)V_j^2 + \left(\frac{\alpha^2}{6R_j} + \frac{j\omega C_{j0}\gamma(\gamma+1)}{6\Phi^2}\right)V_j^3, \quad (5)$$

where $R_j = 1/\alpha I_s$.

Figure 2:
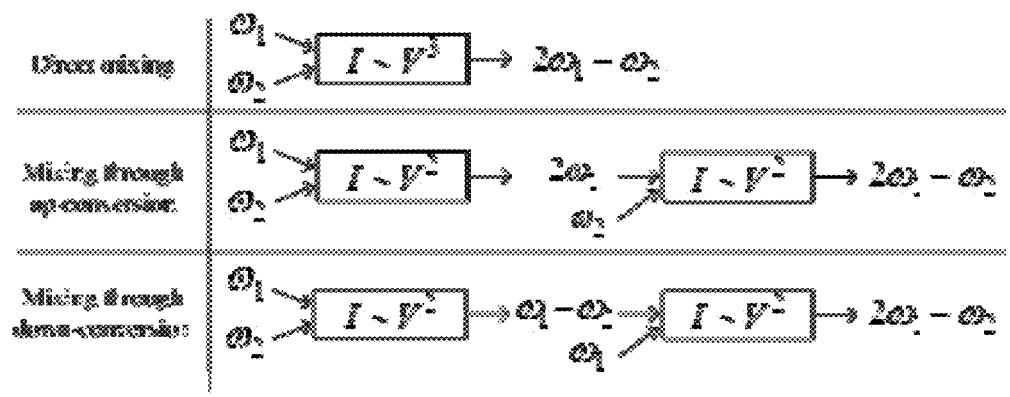
FIG. 2 shows three different mixing processes that generate an intermodulation frequency.

When two sinusoids are applied across the junction, intermodulation products are directly generated by the cubic voltage term of (5). This mechanism is direct intermodulation generation in the following text. In addition to this mechanism, intermodulation terms are generated indirectly by the squared voltage term of (5). In the indirect mixing process, fundamental sinusoids are first mixed producing currents, among other frequencies, at the difference and the first harmonic frequencies. These currents generate a junction voltage that is relative to the impedance across the junction. Modulated voltage then mixes with the fundamental sinusoids generating intermodulation frequencies. The aforementioned mixing processes are illustrated in FIG. 2 and are analyzed below.

In addition to the aforementioned mixing processes, intermodulation terms are produced by higher order terms of Taylor's expansion, which are omitted in (4). Intermodulation terms are also generated, when more successive square and cubic processes are applied. In practice, the currents produced by higher order terms and higher number of consecutive mixing processes are typically weak.

Direct Intermodulation Conversion

Intermodulation currents generated in the direct mixing process are obtained by substituting (1) into the cubic voltage term of (5). The current through the junction at $\omega_{IM} = 2\omega_1 - \omega_2$ is $$I_{j,\omega_{IM},\rightarrow} = \frac{3}{4}V_g^3 S_{jg}^2(\omega_1)S_{jg}(\omega_2)\left[\frac{\alpha}{6R_j} + \frac{j\omega_{IM}C_{j0}\gamma(\gamma+1)}{6\Phi^2}\right]\sin(\omega_{IM}t). \quad (6)$$

Resistive and capacitive mixing terms in (6) can be in the same order of magnitude and therefore neither of them can be neglected in this analysis.

Intermodulation Generation Through Down-Conversion

By substituting (1) into the square voltage term of (5) and solving the current through the junction at the difference frequency $\omega_\Delta = \omega_1 - \omega_2$, one gets $$I_{j,\omega_\Delta} = V_g^2 S_{jg}(\omega_1)S_{jg}(\omega_2)\left[\frac{\alpha}{2R_j} + \frac{j\omega_\Delta C_{j0}\gamma}{2\Phi}\right]\cos(\omega_\Delta t). \quad (7)$$

The voltage across the junction at the difference frequency is $V_{j,\omega_\Delta} = Z_n(\omega_\Delta)I_{j,\omega_\Delta}$, where $Z_n(\omega_\Delta)$ is an impedance of the equivalent Norton current source at the difference frequency, that is, the impedance across the junction.

In a second successive squared-voltage mixing process, in which the voltages at the difference frequency and at $\omega_1$ mix generating a signal at an intermodulation frequency. The junction voltage is $$V_j = Z_n(\omega_\Delta)I_{j,\omega_\Delta} + 2\sqrt{2P_{in}R_g}S_{jg}(\omega_1)\sin(\omega_1 t). \quad (8)$$

By substituting (8) into (5) and solving the current at the intermodulation, one gets $$I_{j,\omega_{IM},\downarrow} = V_g^3 S_{jg}^2(\omega_1)S_{jg}(\omega_2) \quad (9)$$
$$Z_n(\omega_\Delta)\left[\frac{\alpha}{2R_j} + \frac{j\omega_\Delta C_{j0}\gamma}{2\Phi}\right]\left[\frac{\alpha}{2R_j} + \frac{j\omega_{IM}C_{j0}\gamma}{2\Phi}\right]\sin(\omega_{IM}t).$$

At high intermodulation frequencies (>10 MHz) capacitive mixing is typically dominant, that is $$\frac{\alpha}{2R_j} \ll \frac{\omega_{IM}C_{j0}\gamma}{2\Phi},$$

and (8) can be approximated as $$I_{j,\omega_{IM},\downarrow} \approx \quad (10)$$
$$V_g^3 S_{jg}^2(\omega_1)S_{jg}(\omega_2)Z_n(\omega_\Delta)\left[\frac{j\alpha}{2R_j} - \frac{\omega_\Delta C_{j0}\gamma}{2\Phi}\right]\frac{\omega_{IM}C_{j0}\gamma}{2\Phi}\sin(\omega_{IM}t).$$

Intermodulation Generation Through Up-Conversion

Assuming that the capacitive mixing dominates at $2\omega_1$, $$\left(\text{that is } \frac{\alpha}{2R_j} \ll \frac{2\omega_1 C_{j0}\gamma}{2\Phi}\right)$$

and following the preceding procedure for the intermodulation through up-conversion, we get $$I_{j,\omega_{IM},\uparrow} = -\frac{1}{2}V_g^3 S_{jg}^2(\omega_1)S_{jg}(\omega_2)Z_n(2\omega_1)\frac{2\omega_1 C_{j0}\gamma}{2\Phi}\frac{\omega_{IM}C_{j0}\gamma}{2\Phi}\sin(\omega_{IM}t). \quad (11)$$

Intermodulation Response of the Sensor

The voltage across the junction at the intermodulation frequency is $V_{j,\omega_{IM}} = Z_n(\omega_{IM})I_{j,\omega_{IM}}$, where $Z_n(\omega_{IM})$ is an impedance of the equivalent Norton current source at the intermodulation frequency and $I_{j,\omega_{IM}} = I_{j,\omega_{IM},\rightarrow} + I_{j,\omega_{IM},\uparrow} + I_{j,\omega_{IM},\downarrow}$. The voltage across the generator, that is, the backscattered signal, is $$V_{g,\omega_{IM}} = \frac{1}{4}V_g^3 S_{jg}^2(\omega_1)S_{jg}(\omega_2)Z_n(\omega_{IM})S_{gj}(\omega_{IM})\left[\frac{\alpha}{2R_j} + \quad (12)\right.$$

-continued $$\frac{j\omega_{IM}C_{j0}\gamma(\gamma+1)}{2\Phi^2} - \frac{\omega_1\omega_{IM}C_{j0}^2\gamma^2 Z_n(2\omega_1)}{2\Phi^2} +$$

$$\left(\frac{\alpha}{R_j} + \frac{j\omega_\Delta C_{j0}\gamma}{\Phi}\right)\frac{j\omega_{IM}C_{j0}\gamma Z_n(\omega_\Delta)}{\Phi}\right]\sin(\omega_{IM}t),\qquad 5$$

where $S_{gj}$ is the voltage transfer function from junction to the generator. This result can be used to predict the read-out distance of a sensor with the Friis' free space equation. Eq. (12) also relates the impedance of the sensing element to the intermodulation response.

A sensor is implemented by making $Z_n(\omega_\Delta)$ sensitive to an external quantity. Note that other terms of (12) can also be made sensitive to an external quantity, but they exhibit a sensor read-out frequency much above a typical cut-off frequency of a commercial sensor element. On contrary, the difference frequency $\omega_\Delta$ can be very small, even in kHz-range if needed.

Assuming that the ratio between the difference frequency and the carrier frequency is small compared to the bandwidth of the system at the carrier frequency, then $S_{jg}$, $Z_n(\omega_{IM})$, $S_{gj}$, $Z_n(2\omega_1)$, $\omega_1$, and $\omega_{IM}$ can be assumed constants (as a function of the difference frequency). The voltage at the intermodulation frequency across the antenna is proportional to $$V_{g,\omega_{IM}} \sim [A+BZ_n(\omega_\Delta)]\sin(\omega_{IM}t), \qquad (13)$$

where A and B are complex constants. When the relation between the measured quantity and $Z_n(\omega_\Delta)$ is known, Eq. (13) can be used to obtain a measured quantity from a measured intermodulation response of the sensor.

Experiments and Simulations

Sensor Example

Figure 3:
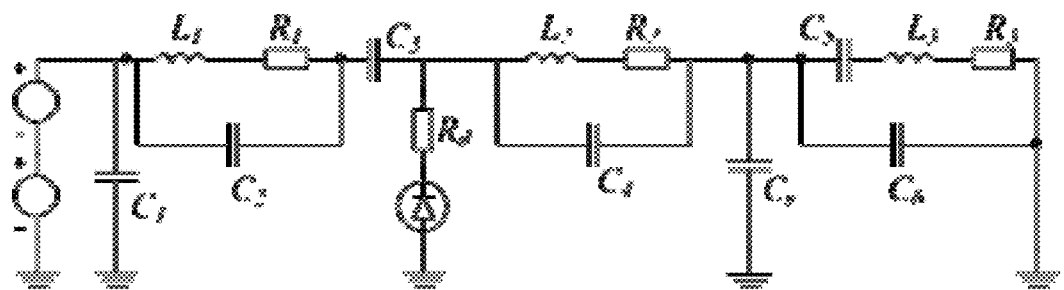
FIG. 3 shows a circuit schematic of a sensor. The antenna is represented with two voltage generators and the quartz crystal is represented with its electrical equivalent circuit.
Figure 4:
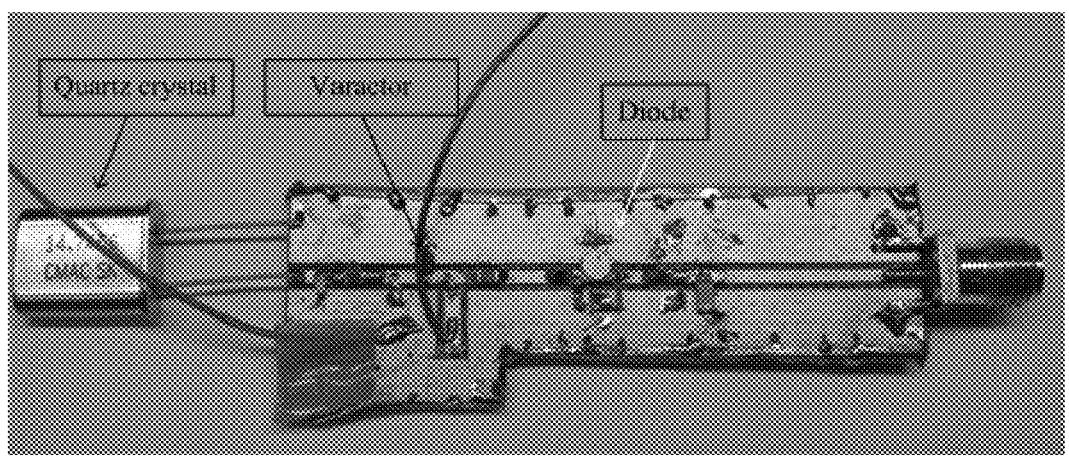
FIG. 4 shows an image of an example sensor

A circuit schematic of an example sensor is illustrated in FIG. 3 and a photograph of the example is shown in FIG. 4.

The example sensor is implemented with lumped circuit elements soldered on a coplanar waveguide structure. A capacitive sensor element is represented with a varactor diode in parallel with a quartz crystal. The capacitance of the varactor is controlled with an external voltage source.

The sensor operation is simulated with the Aplac software (AWR, El Segundo, Calif.) using the harmonic balance simulation. The component values used in the simulations and calculations are shown in Table 1.

TABLE I

| Parameters Used in Simulations And Calculations | |
|---|---|
| Generator resistance | $R_g$ = 30 Ω |
| Series resistance of $L_1$ | $R_1$ = 0.11 Ω |
| Series resistance of mixer diode | $R_d$ = 4.8 Ω |
| Series resistance of $L_2$ | $R_2$ = 1.9 Ω |
| Motional resistance of quartz crystal | $R_3$ = 5.2 Ω |
| Matching inductor | $L_1$ = 10.8 nH |
| RF-block inductor | $L_2$ = 120 nH |
| Motional inductance of quartz crystal | $L_3$ = 5.3 nH |
| Matching capacitor | $C_1$ = 8.3 pF |
| Parallel capacitance of $L_1$ | $C_2$ = 0.07 pF |
| Junction capacitance at zero bias | $C_{j0}$ = 1 pF |
| Low frequency block capacitor | $C_3$ = 3.3 pF |
| Parallel capacitance of $L_2$ | $C_4$ = 3 pF |
| Motional capacitance of quartz crystal | $C_5$ = 22 pF |
| Parallel capacitance of quartz crystal | $C_6$ = 6.8 pF |

TABLE I-continued

| Parameters Used in Simulations And Calculations | |
|---|---|
| Parameter for the depletion capacitance | $\gamma$ = 1.2 |
| Junction potential | $\Phi$ = 1.3 V |
| Saturation current | $I_s$ = 6.3 fA |

Measurement Setup

The intermodulation response of the sensor is measured with a network analyzer (Agilent N5230A) operated with an external signal generator (Agilent E8257C). The excitation signals are combined with a power combiner (Mini-Circuits 15542) and fed to the sensor through a circulator. The reflected signal at an intermodulation frequency is fed to the network analyzer through a circulator.

The sensor is connected to the measurement equipment through a coaxial cable in order to avoid power and phase ambiguities related to unknown propagation properties in a wireless measurement. However, wireless operation is evident and has been demonstrated.

Intermodulation Response

Figure 5:
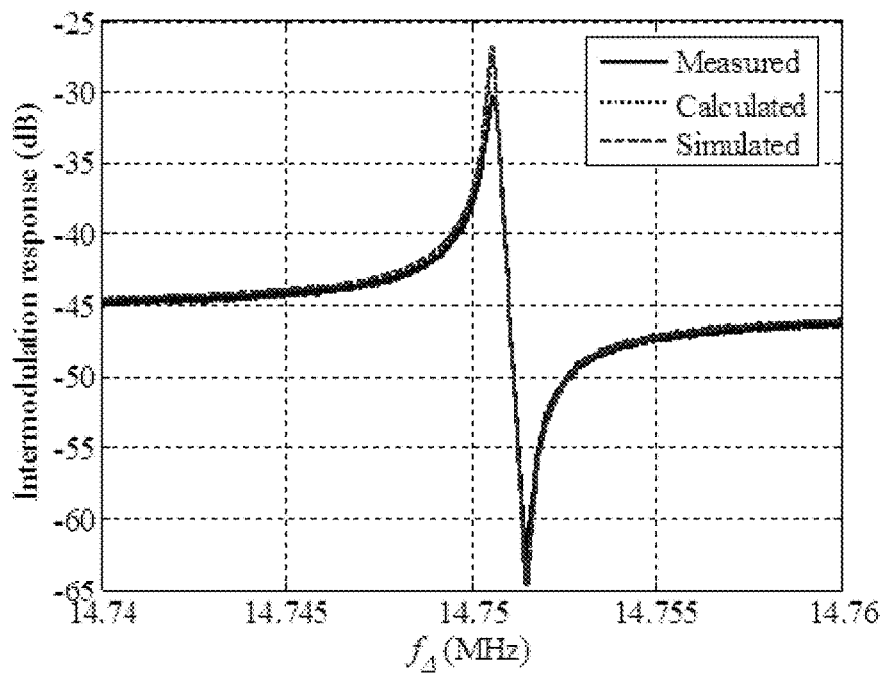
FIG. 5 shows measured, calculated, and simulated intermodulation response of a sensor as a function of the frequency difference. The input power at one frequency is −17.5 dBm and the carrier frequency is 1.25 GHz

Measured, calculated, and simulated intermodulation responses as a function of the frequency difference are shown in FIG. 5. The input power at one frequency is −17.5 dBm and the carrier frequency is 1.25 GHz. The calculated and simulated curves align accurately. Measured response deviates slightly from those at its peak at 14.751 MHz but is in an agreement elsewhere. The measured intermodulation conversion loss is −30 dB at 14.751 MHz, which is 10 dB lower than previously known devices. As a consequence, the read-out distance of the sensor would be 12 m assuming 20 dBm transmit power, 10 dBi reader antenna gain, 3 dBi sensor antenna gain, and −105 dBm receiver sensitivity. The read-out distance of previous sensors would be in the range of 9 m with the same link budget parameters.

Figure 6:
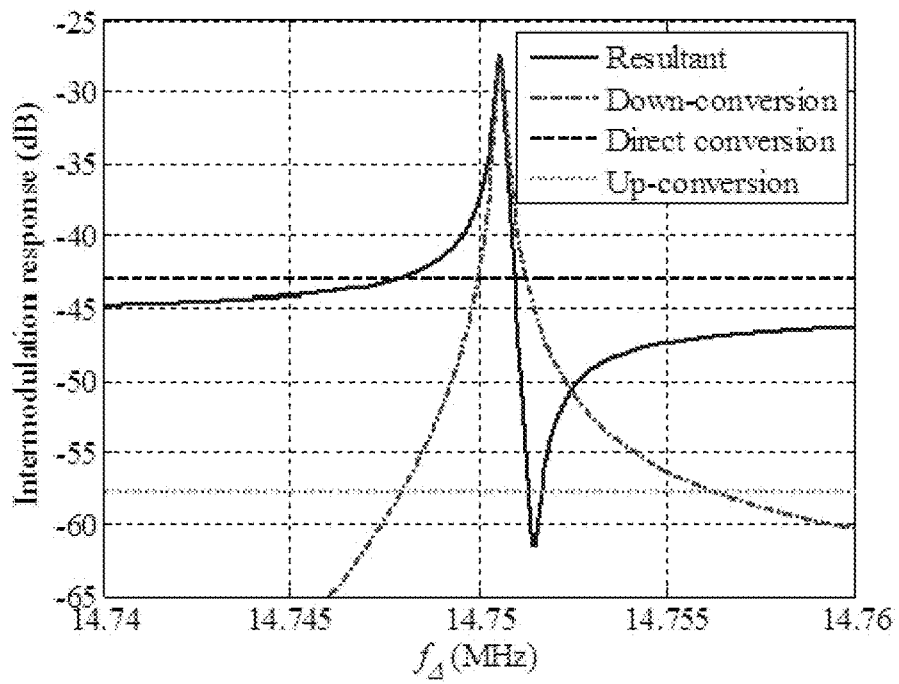
FIG. 6 shows the contribution of different mixing procedures to the total intermodulation response. Dash-dot line shows the intermodulation response due to intermodulation generation through the down-conversion, the dashed black line is the intermodulation response due to direct mixing, and the dotted line represents the intermodulation response generated through an up-conversion.

The intermodulation response shown in FIG. 5 consists of intermodulation terms generated in different mixing procedures, as described above. FIG. 6 illustrates the magnitude of the three terms as a function of the difference frequency. The down-conversion term dominates at the resonance at 14.751 MHz, but the direct conversion term is the strongest elsewhere. The term due to the up-conversion is the weakest in this experiment. As expected in the theoretical analysis, the direct term and up-conversion term remain practically constants across this frequency sweep.

Utilization as a Sensor

Figure 8:
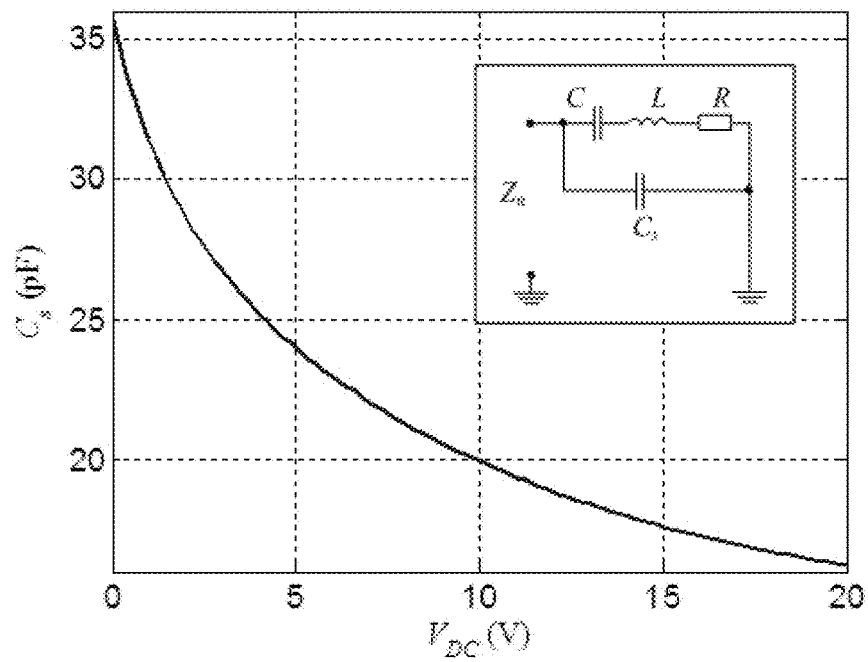
FIG. 8 shows the measured total capacitance in parallel to a quart-crystal as a function of the bias voltage

A capacitive sensor element is represented with a voltage-controlled varactor in parallel with a quartz-crystal. At each capacitance value, the intermodulation response is measured across the frequency range, and the capacitance value is found from $$\min_{A,B,C_s}\{\Sigma_{\omega_\Delta}(|S_{im,meas}|-|A+BZ_n(\omega_\Delta)|)^2\}, \qquad (13)$$

where $S_{im,meas}$ is the measured intermodulation response, A and B are complex constants, and the equivalent circuit for the impedance $Z_n(\omega_\Delta)$ is shown as an insert in FIG. 8. The electrical equivalent circuit for the impedance given in FIG. 8 is a low-frequency approximation for the circuit of FIG. 3.

Eq. (13) exploits only the absolute value of the intermodulation response, because the used measurement equipment was only capable for scalar measurements. Complex data could provide a better fit.

Figure 7:
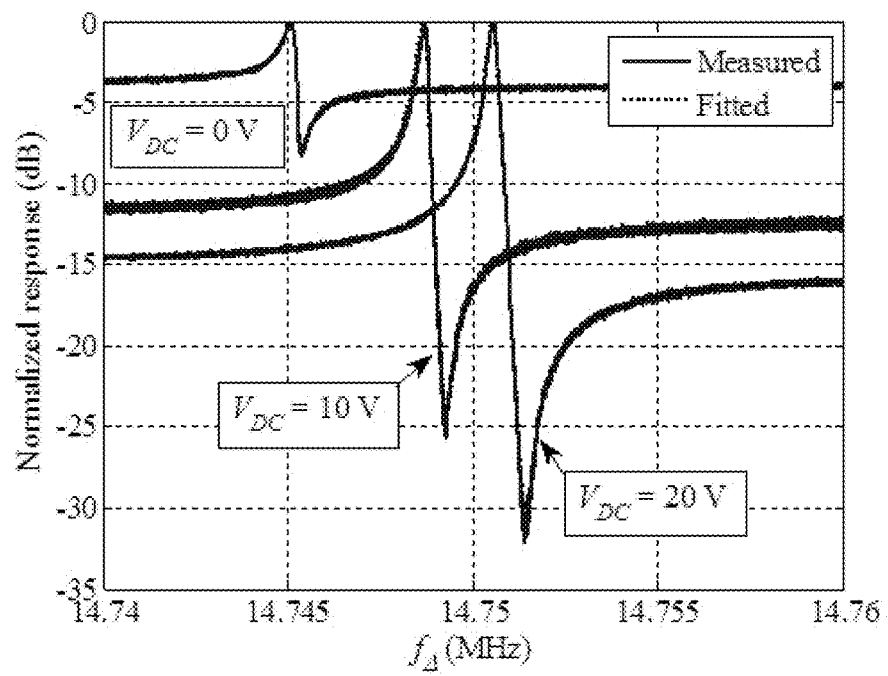
FIG. 7 shows measured (solid) and fitted (dashed) intermodulation responses at different bias voltages.

FIG. 7. shows intermodulation responses measured under different bias voltages of the varactor (representative capacitive sensor element). An increasing bias decreases the capacitance and thus raises the resonance frequency. The obtained total capacitance in parallel to the quartz-crystal as a function of the bias voltage is shown in FIG. 8. The result demonstrates that the concept can be used to read-out a capacitive sensor element. It is straightforward to use the same concept also for resistive and inductive sensors.

Utilization as a Tag

Figure 9:
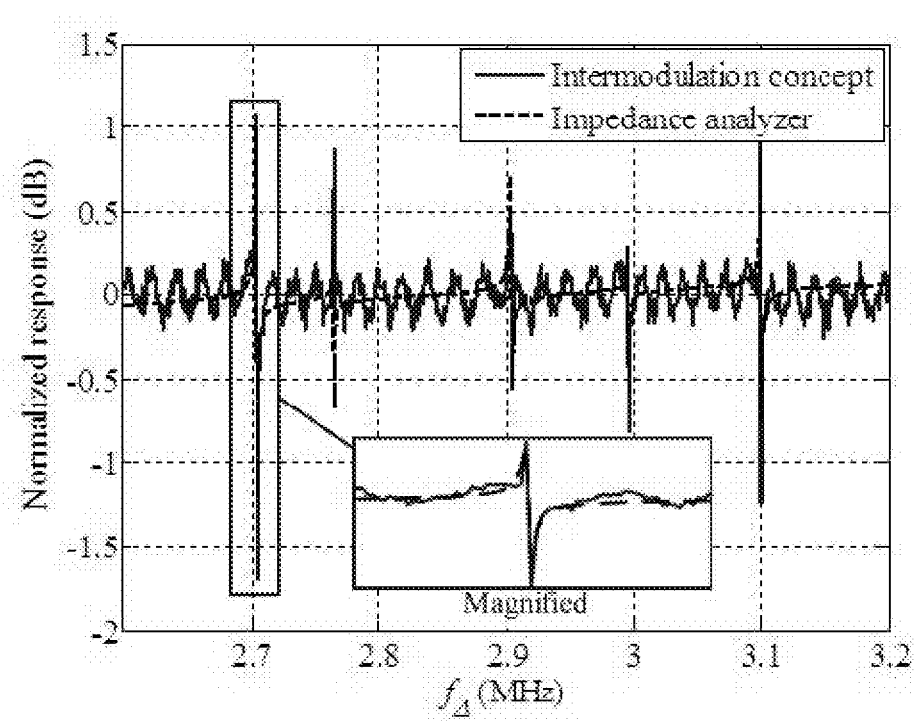
FIG. 9 shows a measured intermodulation response of an example tag and the measured impedance of a quartz crystal.

A tag can be realized by coding the ID to the intermodulation response. A tag can be implemented by replacing the quartz-crystal of the example sensor with another crystal exhibiting several nearby resonances. FIG. 9 shows the impedance of the quartz crystal measured using the intermodulation read-out principle and with an impedance analyzer (4294A, Agilent Technologies). The resonances measured in both ways align in frequency. Each resonance frequency can code a bit or a number.

Presented above is a generic sensor platform that includes a mechanical resonator, such as a Quartz crystal. The platform facilitates a generic sensor element and it utilizes the intermodulation communication principle.

The read-out principle can be used, for example, to monitor moisture in building structures, stresses in bridges and tire pressure in cars. The principle provides very small sensors that could potentially be implanted in humans and be used for health and fitness monitoring.

An embodiment of the present wireless sensor consists of or comprises an antenna, a mixing element, a matching circuitry, a mechanical resonator, and a sensing element. The reader device transmits at two frequencies, which are received by the sensor antenna and mixed in the mixing element. The mixing element produces an excitation at the difference frequency, which is then applied to the mechanical resonator. A sensing element is arranged such that it affects the resonance of the mechanical resonator, for example by loading a quartz crystal with a capacitive sensor. The impedance of the sensing element affects the voltage at the difference frequency, which is finally mixed with one of the transmitted frequencies by the reader.

Similarly, the principles described above can be used to realize passive millimeter wave identification (MMID) tags with large readout distances. In addition, the present disclosure enables several other applications, e.g. implantable sensors within human vessels for monitoring blood pressure and heart beat.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A wireless sensor comprising;
an antenna,
a mixing element conductively connected to the antenna, to a mechanical resonator and to a sensing element,
wherein the mixing element is capable of providing excitation to the mechanical resonator at the difference of two distinct received signal frequencies.

2. A wireless sensor according to claim 1, wherein the mixing element is a Schottky diode.

3. A wireless sensor according to claim 1, wherein the mechanical resonator comprises a quartz crystal or MEMS resonator.

4. A wireless sensor according to claim 1, wherein the sensing element is a capacitive sensor element, resistive sensor element or inductive sensor element.

5. A wireless sensor according to claim 1, further comprising at least one additional mechanical resonator and sensing element pair.

6. A wireless sensor according to claim 5, wherein the mechanical resonator of each pair resonates at a unique frequency.

7. A wireless sensor according to claim 1, wherein the wireless sensor does not contain a battery.

8. A wireless sensor according to claim 1, wherein the antenna acts as the sole voltage source for the wireless sensor.

9. A wireless sensor according to claim 1, wherein the wireless sensor is a passive wireless sensor.

10. A wireless sensor according to claim 1, wherein the mixing element is capable of mixing a voltage modified by the mechanical resonator and sensing element pair with one of at least two signals received by the antenna.

11. A wireless sensor according to claim 1, wherein the antenna is coupled to the mixing element and is capable of receiving signals at at least two distinct frequencies simultaneously and re-transmitting a modified form of at least one of said received signals.

12. A wireless sensor according to claim 1, wherein the mixing element and sensing element are separate elements.

13. A wireless sensor according to claim 1, wherein the antenna is coupled with a first matching circuit.

14. A wireless sensor according to claim 1, wherein the mixing element is coupled with a second matching circuit.

15. A wireless sensor according to claim 1 wherein the mechanical resonator and sensing element are configured so as to provide a response at a frequency less than 100 kHz.

16. A wireless sensor according to claim 1 wherein the sensing element is a capacitive sensing element and the mechanical resonator is in parallel with the sensing element in order to form a low frequency circuit.

17. A method of wirelessly reading a sensor element comprising the steps of;
  transmitting two signals from a reading device to a wireless sensor, wherein each signal is transmitted at a different frequency,
  wherein the difference between the two signal frequencies induces an excitation of a mechanical resonator conductively connected to a sensing element,
  receiving an intermodulation response from the wireless sensor,
  determining the impedance of a sensing element based on the received intermodulation response, and
  providing a readout of the sensor element based on the determined impedance and known resonance of the mechanical resonator coupled to the sensing element.

18. A method according to claim 17, wherein determining the impedance includes measuring the intermodulation response across a frequency range.

19. A method according to claim 17, wherein the difference between the frequencies of the two transmitted signals is between 0.1-100 kHz.

* * * * *